United States Patent
Kogo

(10) Patent No.: US 11,636,958 B2
(45) Date of Patent: Apr. 25, 2023

(54) COMMUNICATION CABLE AND WIRE HARNESS

(71) Applicant: Yazaki Corporation, Tokyo (JP)

(72) Inventor: Kosuke Kogo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 202 days.

(21) Appl. No.: 17/010,278

(22) Filed: Sep. 2, 2020

(65) Prior Publication Data

US 2021/0065926 A1    Mar. 4, 2021

(30) Foreign Application Priority Data

Sep. 4, 2019 (JP) .............................. JP2019-160950
Sep. 2, 2020 (JP) .............................. JP2020-147288

(51) Int. Cl.
*H01B 3/44* (2006.01)
*H01B 7/00* (2006.01)
*C08L 23/06* (2006.01)
*C08L 23/12* (2006.01)

(52) U.S. Cl.
CPC .............. *H01B 3/441* (2013.01); *C08L 23/06* (2013.01); *C08L 23/12* (2013.01); *H01B 3/443* (2013.01); *H01B 7/0045* (2013.01); *C08L 2201/02* (2013.01); *C08L 2201/08* (2013.01); *C08L 2203/202* (2013.01); *C08L 2205/025* (2013.01); *C08L 2205/03* (2013.01); *C08L 2205/035* (2013.01)

(58) Field of Classification Search
CPC . H01B 3/128; H01B 3/13; H01B 7/02; H01B 7/29; H01B 7/292; H01B 7/295; H01B 7/0045; B60R 16/207
See application file for complete search history.

(56) References Cited

U.S. PATENT DOCUMENTS

| | | | |
|---|---|---|---|
| 2008/0234419 A1 | 9/2008 | Kambe | |
| 2012/0318556 A1* | 12/2012 | Kogo | H01B 3/442 174/110 SR |
| 2013/0008691 A1* | 1/2013 | Shimada | H01B 3/28 524/375 |
| 2014/0008099 A1* | 1/2014 | Kogo | H01B 7/295 174/110 SR |
| 2018/0114610 A1 | 4/2018 | Uegaki et al. | |
| 2018/0134883 A1* | 5/2018 | Bringuier | G02B 6/443 |
| 2018/0286537 A1* | 10/2018 | Horiuchi | H01B 7/0045 |
| 2019/0027272 A1 | 1/2019 | Uegaki et al. | |
| 2020/0118708 A1 | 4/2020 | Uegaki et al. | |
| 2020/0386964 A1* | 12/2020 | Cheng | G02B 6/4429 |

FOREIGN PATENT DOCUMENTS

CN         106205791 A    * 12/2016   ........... H01B 7/0045
JP         2017-188431 A    10/2017

* cited by examiner

*Primary Examiner* — Paresh Paghadal
(74) *Attorney, Agent, or Firm* — Sughrue Mion, PLLC

(57) ABSTRACT

A communication cable includes an insulated wire including a conductor and a covering layer covering the conductor, the covering layer being made of an insulator, and a sheath covering an outer circumferential surface of the insulated wire, the sheath including a resin composition containing a polyolefin and a thermoplastic elastomer. A tensile modulus of elasticity of the sheath is 500 MPa or less, and a mass increase rate of the sheath is less than 50% by mass when the sheath is immersed in a diisononyl phthalate at 100° C. for 72 hours.

7 Claims, 8 Drawing Sheets

COMMUNICATION CABLE AND WIRE HARNESS

CROSS-REFERENCE TO RELATED APPLICATIONS

The present application is based upon and claims the benefit of priority from Japanese Patent Applications No. 2019-160950, filed on Sep. 4, 2019, and No. 2020-147288, filed on Sep. 2, 2020, the entire contents of which are incorporated herein by reference.

TECHNICAL FIELD

The disclosure relates to a communication cable and a wire harness.

BACKGROUND

Computerization of vehicles has recently progressed, and the demand for higher communication speed has increased also in electric wires installed in vehicles. As a communication medium, a communication cable having insulated wires covered with a sheath is known. JP2017-188431A discloses a communication cable having insulated wires covered with a sheath made of a polypropylene resin.

SUMMARY

In vehicles, insulated wires, cables and the like are sometimes bundled with a tape and used as a wire harness. For an insulator of the insulated wires and a base material of the tape, polyvinyl chloride is often used, which is highly flame retardant and low cost. A plasticizer is usually added to the polyvinyl chloride used for these to impart flexibility. However, the plasticizer bleeds on the surface of the material as time passes, comes in contact with the sheath of the communication cable and thus transfers to the sheath. In particular, the plasticizer tends to bleed to transfer to the sheath in a high temperature environment such as in a vehicle. This plasticizer may decrease dielectric properties of the sheath and the communication speed of the communication cable. Moreover, the plasticizer transferring to the sheath may transfer to the insulator of insulated wires and further decrease the communication speed of the communication cable.

In contrast, a method to prevent the transfer of the plasticizer by increasing the crystallinity of the resin composition of the sheath is conceivable. However, such a resin composition tends to be less flexible. To make the bundle of insulated wires compact and place it in a narrow space in vehicles, a communication cable with high flexibility and excellent communication characteristics is demanded.

In response to the above issue, it is an object of this disclosure to provide a communication cable with high flexibility and excellent communication characteristics and a wire harness using the communication cable.

A communication cable according to some embodiments contains an insulated wire includes a conductor and a covering layer covering the conductor, the covering layer being made of an insulator; and a sheath covering an outer circumferential surface of the insulated wire, the sheath including a resin composition containing a polyolefin and a thermoplastic elastomer, and a tensile modulus of elasticity of the sheath is 500 MPa or less, and a mass increase rate of the sheath is less than 50% by mass when the sheath is immersed in a diisononyl phthalate at 100° C. for 72 hours.

In the communication cable, the thermoplastic elastomer may include a thermoplastic vulcanizate, a content rate of the thermoplastic vulcanizate to the total of the polyolefin and the thermoplastic elastomer may be 15% by mass or more and less than 45% by mass when a shore A hardness of the thermoplastic vulcanizate is 23 or more and 30 or less, and a content rate of the thermoplastic vulcanizate to the total of the polyolefin and the thermoplastic elastomer may be 35% by mass or more and 50% by mass or less when the shore A hardness of the thermoplastic vulcanizate is 31 or more and 42 or less.

In the communication cable, a shore A hardness of the thermoplastic elastomer may be 80 or less.

In the communication cable, the resin composition may further contain 40 to 150 parts by mass of a metal hydroxide per 100 parts by mass of the total of the polyolefin and the thermoplastic elastomer.

In the communication cable, the resin composition may further contain 40 to 100 parts by mass of a metal hydroxide and 10 to 30 parts by mass of a halogen-based flame retardant per 100 parts by mass of the total of the polyolefin and the thermoplastic elastomer, and a relative permittivity of the resin composition may be 6 or less, and a dielectric loss tangent of the resin composition may be $1 \times 10^{-2}$ or less.

In the communication cable, a relative permittivity of the resin composition may be 2.5 or more and 4.0 or less, and a dielectric loss tangent of the resin composition may be $8.0 \times 10^{-3}$ or less, and the conductor may be a conductor of 0.13 sq. specified in ISO21111-8.

In the communication cable, a relative permittivity of the resin composition may be 3.0 or more and 3.5 or less.

A wire harness according to some embodiments includes the communication cable and a polyvinyl chloride electric wire, and the communication cable and the polyvinyl chloride electric wire are bundled.

According to this disclosure, a communication cable with high flexibility and excellent communication characteristics, and a wire harness using the communication cable are provided.

DETAILED DESCRIPTION

Figure 1:
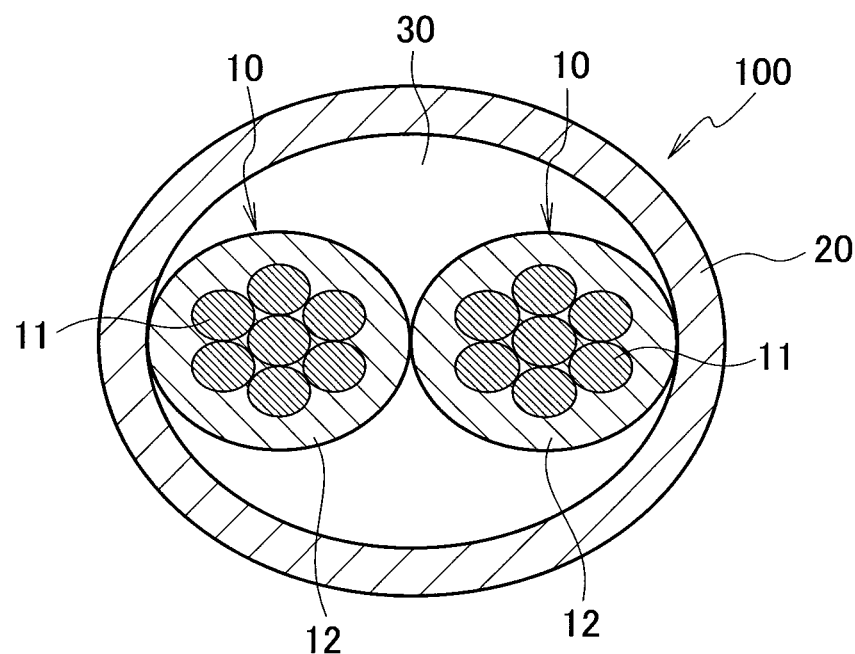
FIG. 1 is a schematic sectional view of an example of a communication cable according to the present embodiment.

A communication cable and a wire harness using the communication cable according to a present embodiment are described below with reference to drawings. Note that the dimensional ratios in the drawings are exaggerated for convenience of explanation and may differ from the actual ratios.

[Communication Cable]

As shown in FIG. 1, a communication cable 100 includes insulated wires 10 and a sheath 20 covering outer circumferential surfaces of the insulated wires 10. The sheath 20 is in a cylindrical shape and includes a hollow part therein in a diameter direction. The insulated wires 10 are arranged in the hollow part, and the sheath 20 extends in an axial direction of the insulated wires 10. The thickness of the sheath 20 is not limited and may be 0.1 to 1 mm, for example.

Figure 2:
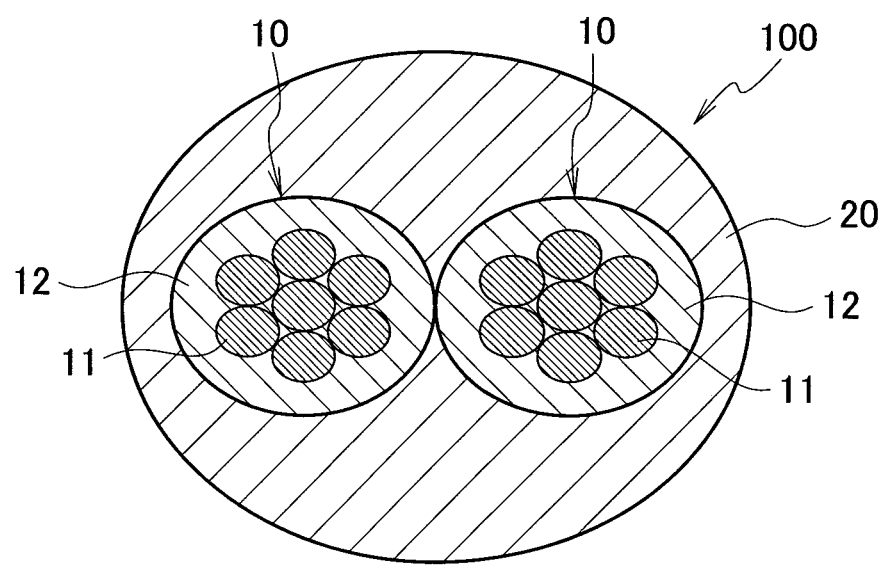
FIG. 2 is a schematic sectional view of another example of the communication cable according to the present embodiment.

In the present embodiment, two insulated wires 10 form a twisted pair. However, the number of the insulated wires 10 is at least one. In the present embodiment, as shown in FIG. 1, a vacant space 30 is provided between the insulated wires 10 and the sheath 20. However, as shown in FIG. 2, the communication cable 100 is not provided with the vacant space 30, and the outer surfaces of the insulated wires 10 may be directly covered by the sheath 20.

The sheath 20 contains a resin composition. As described above, a plasticizer added to the polyvinyl chloride may bleed on the surface of the material and transfer to the sheath 20 with a long-term use. The dielectric loss tangent of a plasticizer is generally high. In particular, a phthalate plasticizer and a trimellitate plasticizer have large dielectric loss tangents. As the dielectric loss tangent becomes large, the insertion loss of the communication cable 100 increases, hindering the high-speed communication of the communication cable. For this reason, when a plasticizer transfers to the resin composition of the sheath 20 as well as when the plasticizer is included in the resin composition of the sheath 20, dielectric properties of the sheath 20 decrease, which may hinder the high-speed communication.

Accordingly, in the communication cable 100 according to the present embodiment, the mass increase rate of the sheath 20 when immersed in diisononyl phthalate at 100° C. for 72 hours is less than 50% by mass. Diisononyl phthalate (DINP) is a typical plasticizer, and other plasticizers used in polyvinyl chloride are considered to have a similar tendency.

Figure 3:
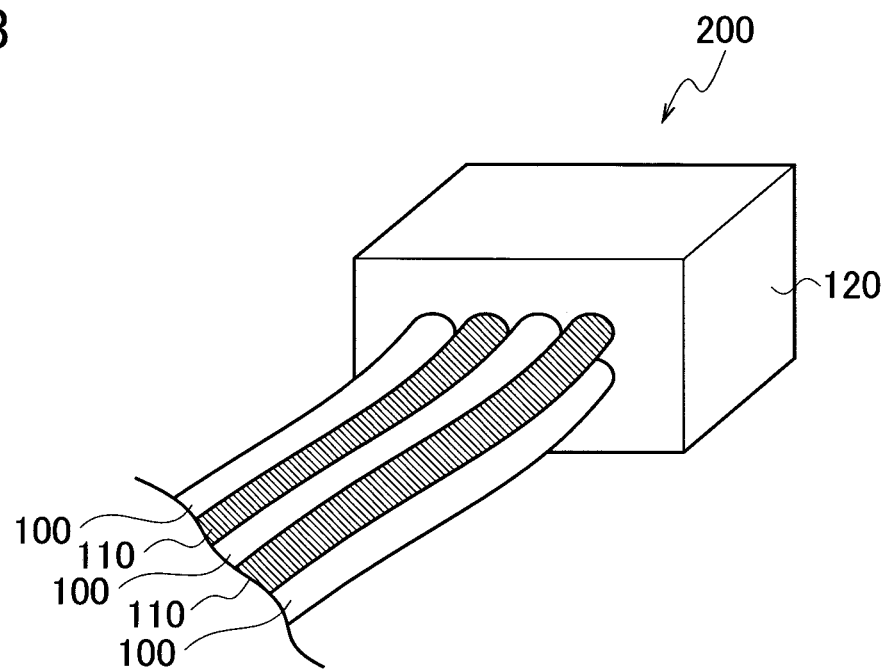
FIG. 3 is a schematic perspective view of an example of a wire harness according to the present embodiment.

As the mass increase rate of the sheath 20 is less than 50% by mass, the transfer of the plasticizer to the sheath 20 is prevented even when a wire harness 200 is formed by bundling the communication cables 100 and polyvinyl chloride electric wires 110 as shown in FIG. 3. Since the amount of the plasticizer transferring to the sheath 20 is small, the dielectric loss tangent of the sheath 20 becomes small.

A dielectric substance, such as a resin composition, has a large permittivity and a large dielectric loss tangent, and the attenuation in high frequency signals in the communication cable becomes larger as the frequency becomes higher. In the present embodiment, the mass increase rate of the sheath 20 is set to less than 50% by mass, and thus the dielectric loss tangent is reduced to prevent the attenuation, enabling the communication in the high frequency band. A preferable transmission speed with the communication cable 100 according to the present embodiment is 1 Gbps or less. Moreover, in the present embodiment, since the mass increase rate of the sheath 20 is small, deterioration of communication quality of the communication cable, such as attenuation, is controlled for a long period even when used in an environment such as a vehicle. Furthermore, since the mass increase rate of the sheath 20 is small, the transfer of the plasticizer to the insulated wires 10 from the outside of the communication cable 100 is also prevented. The mass increase rate of the sheath 20 is preferably less than 40% by mass, more preferably less than 30% by mass. Since the mass increase rate is preferably smaller, the lower limit of the mass increase rate may be 0% by mass or more. The mass increase rate is adjustable by composition of the resin composition as described below, and the like. To obtain the above mass increase rate, it is effective to use a material with high crystallinity, such as homo polypropylene, for the resin composition. However, such a resin composition has a high tensile modulus of elasticity, and the communication cable 100 is difficult to bend. Thus, it may be difficult to place the communication cable 100 in narrow spaces.

Accordingly, in the present embodiment, the tensile modulus of elasticity of the sheath 20 is set to 500 MPa or less. By setting the tensile modulus of elasticity of the sheath 20 to 500 MPa or less, the communication cable 100 is easily bent and easily placed in narrow spaces. The tensile modulus of elasticity is adjustable by composition of the resin composition as described below, and the like.

The tensile modulus of elasticity is measured in accordance with the provisions of JIS K7161-1 (Plastics-Determination of tensile properties-Part 1: General principles). Specifically, the sheath 20 is strained at a strain speed of 50 mm/min at room temperature of 20° C., and the following formula is used for calculation:

$$E_t = (\sigma_2 - \sigma_1)/(\varepsilon_2 - \varepsilon_1)$$

where $E_t$ is tensile modulus of elasticity (Pa), $\sigma_1$ is stress (Pa) at strain $\varepsilon_1 = 0.0005$, and $\sigma_2$ is stress (Pa) at strain $\varepsilon_2 = 0.0025$.

The resin composition contains polyolefin and a thermoplastic elastomer. The content rate of the polyolefin to the total of the polyolefin and the thermoplastic elastomer is preferably 55% by mass or more and 85% by mass or less. When the content rate of the polyolefin is 55% by mass or more, it becomes difficult for the plasticizer to transfer to the resin composition, resulting in a reduced mass increase rate of the sheath 20. When the content rate of the polyolefin is 85% by mass or less, the tensile modulus of elasticity becomes low, improving the workability of placing the communication cable 100. The content rate of the polyolefin is more preferably 65% by mass or more and 80% by mass or less.

The content rate of the thermoplastic elastomer to the total of the polyolefin and the thermoplastic elastomer is preferably 15% by mass or more and 50% by mass or less. The thermoplastic elastomer may include a thermoplastic vulcanizate as described below. A content rate of the thermoplastic vulcanizate to the total of the polyolefin and the thermoplastic elastomer is preferably 15% by mass or more and less than 45% by mass when a shore A hardness of the thermoplastic vulcanizate is 23 or more and 30 or less. A content rate of the thermoplastic vulcanizate to the total of the polyolefin and the thermoplastic elastomer is preferably 35% by mass or more and 50% by mass or less when the shore A hardness of the thermoplastic vulcanizate is 31 or more and 42 or less. When the shore A hardness of the thermoplastic vulcanizate is 23 or more and 30 or less and the content rate of the thermoplastic vulcanizate is 15% by mass or more, and when the shore A hardness of the thermoplastic vulcanizate is 31 or more and 42 or less and the content rate of the thermoplastic vulcanizate is 35% by mass or more, the tensile modulus of elasticity of the sheath 20 becomes lower. Accordingly, the workability of placing the communication cable 100 is improved. When the shore A hardness of the thermoplastic vulcanizate is 23 or more and 30 or less and the content rate of the thermoplastic vulcanizate is less than 45% by mass, and when the shore A hardness of the thermoplastic vulcanizate is 31 or more and 42 or less and the content rate of the thermoplastic vulcanizate is 50% by mass or less, the mass increase rate of the sheath 20 becomes lower. Accordingly, the communication reliability of the communication cable 100 is maintained for a long time. The content rate of the thermoplastic vulcanizate is more preferably 20% by mass or more and 35% by mass or less when the shore A hardness of the thermoplastic vulcanizate is 23 or more and 30 or less.

The shore A hardness of the thermoplastic elastomer is preferably 80 or less. By setting the shore A hardness to 80 or less, the tensile modulus of elasticity of the sheath becomes low, improving the workability of placement. The shore A hardness may be 70 or less, 50 or less, or 30 or less. The lower limit of the shore A hardness is not particularly limited. The shore A hardness may be 20 or more, 30 or more, or 40 or more.

The relative permittivity of the resin composition is preferably 6 or less. Characteristic impedance is decided for a communication cable used in vehicles. Characteristic impedance depends on the structure of the communication cable as well as on the relative permittivity of the dielectric substance such as the resin composition, The communication cable used in vehicles is required to be lightweight and compact. When the relative permittivity is high, it is necessary to increase the finished outer diameter of insulated wires. When the relative permittivity of the resin composition is 6 or less, it is applicable to a communication cable having conductors of the smallest diameter with a size of 0.13 sq. defined in ISO21111-8.

The relative permittivity is adjustable by the content of an inorganic filler contained in the resin composition as described below. The relative permittivity of the resin composition is more preferably 2.5 or more and 4.0 or less. By setting the relative permittivity to 2.5 or more, the sheath 20 is made to have a thickness easy to manufacture while the standard of ISO21111-8 is satisfied, improving production efficiency of the communication cable 100. By setting the relative permittivity of the resin composition to 4.0 or less, the sheath 20 is made thin, preventing the communication cable 100 from having too large outer diameter and too much weight. The relative permittivity of the resin composition is furthermore preferably 3.0 or more and 3.5 or less. The relative permittivity is measured at a frequency of 10 GHz in an atmosphere of 30° C. by a cavity resonator method.

The dielectric loss tangent of the resin composition is preferably $1 \times 10^{-2}$ or less. When the dielectric loss tangent of the resin composition is less than or equal to the above value, the increase in the insertion loss of the communication cable 100 is prevented. The dielectric loss tangent is preferably less than $8.0 \times 10^{-3}$. Since the dielectric loss tangent is preferably smaller, the lower limit of the dielectric loss tangent is 0. The dielectric loss tangent is measured at a frequency of 10 GHz in an atmosphere of 30° C. by a cavity resonator method.

The relative permittivity of the resin composition may be 2.5 or more and 4.0 or less, the dielectric loss tangent of the resin composition may be $8.0 \times 10^{-3}$, and conductors 11 may be 0.13 sq. conductors specified in ISO21111-8. The above communication cable 100 has a small diameter and good communication characteristics and thus is suitable for use in vehicles as the communication cable 100 capable of high-speed communications.

(Polyolefin)

Polyolefin is a polymer of monomers including olefin. Polyolefin may be a polymer of olefin alone, or a copolymer of olefin and a monomer other than olefin. A polymer of olefin alone may be of one type of olefin or of two or more types of olefin. Polyolefin may be modified with maleic acid or the like, or may not be modified.

The olefin may include α-olefin, β-olefin, and γ-olefin. α-Olefin may include at least one monomer selected from the group consisting of ethylene, propylene, 1-butene, 1-pentene, 1-hexene, 4-methyl-1-pentene, 1-octene, 1-decene, and the like.

A monomer other than olefin may have a carbon-carbon double bond. A monomer other than olefin may contain at least either one of styrene and acrylate, and the like.

The polyolefin may be at least one selected from the group consisting of low density polyethylene (LDPE), linear low density polyethylene (LLDPE), high density polyethylene (HDPE), homo polypropylene (homo PP), random polypropylene (random PP), block polypropylene (block PP), an ethylene-propylene-butene copolymer, and the like.

(Thermoplastic Elastomer)

The thermoplastic elastomer may include at least one elastomer selected from the group consisting of a thermoplastic olefinic elastomer (TPO), a thermoplastic vulcanizate (TPV), and a thermoplastic styrenic elastomer (TPS). A thermoplastic elastomer may be modified with maleic acid or the like, or may not be modified.

The thermoplastic olefinic elastomer (TPO) is a mixture of polyolefin and rubber, and the mixed rubber has no or little crosslinking points. For the polyolefin, the above-described one may be used. Examples of the rubber used for the thermoplastic olefinic elastomer (TPO) include natural rubber (NR), isoprene rubber (IR), butadiene rubber (BR), styrene-butadiene copolymer rubber (SBR), acrylonitrile-butadiene copolymer rubber (NBR), chloroprene rubber (CR), butyl rubber (IIR), ethylene-propylene rubber (EPM), and ethylene-propylene-diene rubber (EPDM).

Examples of the thermoplastic olefinic elastomer include Prime TPO (registered trademark) provided by Prime Polymer Co., Ltd.

The thermoplastic vulcanizate is a mixture of polyolefin and rubber, and the mixed rubber is cross-linked by dynamic vulcanization. For the rubber, one used for the above thermoplastic olefinic elastomer may be used. Thermoplastic vulcanizate has both a characteristic of not expanding easily by a highly crystalline resin plasticizer, such as ethylene and homo polypropylene, and rubber-like flexibility.

Examples of the thermoplastic vulcanizate include THERMORUN (registered trademark) provided by Mitsubishi Chemical Corporation, MILASTOMER (registered trademark) provided by Mitsui Chemicals, Inc., EXCELINK (registered trademark) provided by JSR Corporation, ESPOLEX (registered trademark) TPE Series provided by SUMITOMO CHEMICAL COMPANY, LIMITED, and Santoprene (registered trademark) provided by Exxon Mobil Corporation.

The thermoplastic styrenic elastomer (TPS) may be a block copolymer having an aromatic vinyl polymer block (hard segment) and a diene polymer block (soft segment), or a random copolymer. A monomer constituting aromatic vinyl polymer may be styrene, α-substituted styrenes, such as α-methylstyrene, α-ethylstyrene and α-methyl-p-methylstyrene, o-methylstyrene, m-methylstyrene, p-methylstyrene, 2,4-dimethylstyrene, ethylstyrene, 2,4,6-trimethylstyrene, o-t-butylstyrene p-t-butylstyrene and the like. The diene polymer block may be a copolymer of at least one of butadiene and isoprene, or the copolymer partially hydrogenated.

The thermoplastic styrenic elastomer (TPS) may be a block copolymer of at least one selected from the group consisting of polystyrene-polybutadiene-polystyrene (SBS), polystyrene-polyisoprene-polystyrene (SIS), polystyrene-polyisobutylene-polystyrene (SIBS), polystyrene-poly(ethylene-butylene)-polystyrene (SEBS), polystyrene-poly(ethylene-butylene)-crystalline polyolefin (SEBC), and polystyrene-poly(ethylene-propylene)-polystyrene (SEPS).

Examples of the thermoplastic styrenic elastomer include TEFABLOC (registered trademark) provided by Mitsubishi Chemical Corporation, ESPOLEX (registered trademark) SB Series provided by SUMITOMO CHEMICAL COMPANY, LIMITED, SEPTON (registered trademark) provided by Kuraray Co., Ltd., DYNARON (registered trademark) provided by JSR Corporation, and HYBRAR (registered trademark) provided by Kuraray Co., Ltd.

For the resin composition, various additives may be added as far as the additives do not prevent effects of the present embodiment, in addition to the polyolefin and the thermoplastic elastomer. Examples of the additives include a flame retardant, an inorganic filler, a flame retardant aid, an antioxidant, a processing aid, a cross-linker, a metal deactivator, an anti-aging agent, a filler, a reinforcing agent, an ultraviolet absorber, a stabilizer, a plasticizer, a pigment, a dye, a colorant, an antistatic agent, and a foaming agent.

(Flame Retardant)

A flame retardant improves flame retardancy of the sheath 20. By improving flame retardancy of the sheath 20, the sheath 20 can prevent the spread of fire in case of fire in a vehicle. It is thus not necessarily required to give flame retardancy to a covering layer 12 of the insulated wire 10. However, it is preferable to add a flame retardant to the covering layer 12 from the perspective of improving flame retardancy.

The flame retardant may be at least one of an organic flame retardant and an inorganic flame retardant, for example. Examples of the organic flame retardant include a halogen-based flame retardant, such as a bromine-based flame retardant and a chlorine-based flame retardant, and a phosphorus-based flame retardant, such as a phosphoric ester, a condensed phosphoric ester, a cyclic phosphorus compound, and red phosphorus. Examples of the inorganic flame retardant include at least one metal hydroxide selected from the group consisting of aluminum hydroxide, magnesium hydroxide, and calcium hydroxide. These flame retardants may be used alone or in combination of two or more. The flame retardant may include the organic flame retardant and the inorganic flame retardant, for example. The organic flame retardant preferably includes a halogen-based flame retardant.

The halogen-based flame retardant captures hydroxyl radicals promoting the combustion of the resin composition and suppresses the combustion of the resin composition. The halogen-based flame retardant may be, for example, a compound in which at least one or more halogens are substituted with an organic compound. Examples of the halogen-based flame retardant include a fluorine-based flame retardant, a chlorine-based flame retardant, a bromine-based flame retardant, and an iodine-based flame retardant. The halogen-based flame retardant is preferably a bromine-based flame retardant.

Examples of bromine-based flame retardants include 1,2-bis(bromophenyl)ethane, 1,2-bis(pentabromophenyl)ethane, hexabromobenzene, ethylenebis-dibromonorbornanedicarboximide, ethylenebis-tetrabromophthalimide, tetrabromobisphenol S, tris(2,3-dibromopropyl-1)isocyanurate, hexabromocyclododecane (HBCD), octabromophenyl ether, tetrabromobisphenol A (TBA), TBA epoxy oligomer or polymer, TBA-bis(2,3-dibromopropyl ether), decabromodiphenyl oxide, polydibromophenylene oxide, bis(tribromophenoxy)ethane, ethylenebis-pentabromobenzene, dibromoethyl-dibrocyclohexane, dibromoneopentyl glycol, tribromophenol, tribromophenolallyl ether, tetradecabromodiphenoxybenzene, 2,2-bis(4-hydroxy-3,5-dibromophenyl)propane, 2,2-bis(4-hydroxyethoxy-3,5-dibromophenyl)propane, pentabromophenol, pentabromotoluene, pentabromodiphenyl oxide, hexabromodiphenyl ether, octabromodiphenyl ether, decabromodiphenyl ether, octabromodiphenyl oxide, dibromoneopentyl glycol tetracarbonate, bis(tribromophenyl)fumaramide, and N-methylhexabromophenylamine. The flame retardant preferably includes 1,2-bis(pentabromophenyl)ethane, and tetrabromobisphenol A. Such a flame retardant has a low relative permittivity and thus gives flame retardancy while preventing an increase in the viscosity and the relative permittivity of the resin composition.

The content of the flame retardant in the resin composition is preferably 5 to 200 parts by mass, more preferably 50 to 160 parts by mass per 100 parts by mass of the total of the polyolefin and the thermoplastic elastomer. By setting the flame retardant content in the above-described range, the flame retardancy is improved satisfactorily while mechanical properties of the resin composition is maintained.

The content of the organic flame retardant in the resin composition is preferably 5 to 40 parts by mass, more preferably 10 to 30 parts by mass, per 100 parts by mass of the total of the polyolefin and the thermoplastic elastomer. The content of the inorganic flame retardant in the resin composition is preferably 30 to 200 parts by mass, more preferably 40 to 150 parts by mass, per 100 parts by mass of the total of the polyolefin and the thermoplastic elastomer. By setting the content of the inorganic flame retardant to 30 parts by mass or more, the relative permittivity of the resin composition is prevented from getting too low. By setting the content of the inorganic flame retardant to 150 parts by mass or less, the relative permittivity of the resin composition is prevented from getting too high, and the flexibility of the resin composition is also prevented from reducing. Moreover, by setting the content of the inorganic flame retardant to 150 parts by mass or less, the viscosity of the resin composition decreases, thus improving the workability of the resin composition.

The resin composition preferably further contains 40 to 150 parts by mass of a metal hydroxide per 100 parts by mass of the total of the polyolefin and the thermoplastic elastomer. By setting the content of the metal hydroxide to 40 parts by mass or more, the relative permittivity of the resin composition is prevented from getting too low, and the flame retardancy is improved. By setting the content of the metal hydroxide to 150 parts by mass or less, the relative permittivity of the resin composition is prevented from getting too high, and the flexibility of the resin composition is improved. Moreover, by setting the content of the metal hydroxide to 150 parts by mass or less, the viscosity of the resin composition decreases, thus improving the workability of the resin composition. The resin composition may contain 80 parts by mass or more of a metal hydroxide per 100 parts by mass of the total of the polyolefin and the thermoplastic elastomer. The resin composition may contain 100 parts by mass or less of a metal hydroxide per 100 parts by mass of the total of the polyolefin and the thermoplastic elastomer.

When the viscosity of the resin composition is high, extrudability of the resin composition is improved by reducing the content of the inorganic flame retardant and increasing the content of the organic flame retardant. When the flame retardant contains an organic flame retardant and an inorganic flame retardant, the ratio of the inorganic flame retardant to the organic flame retardant may be within the range of from 0.75 to 40, and may be within the range of from 1 to 10, for example.

(Inorganic Filler)

The resin composition may contain an inorganic filler to control the permittivity of the resin composition. The inorganic filler may contain the above-described inorganic flame retardant. Examples of the inorganic filler include a metal oxide, such as the above-described metal hydroxide, an aluminium oxide and a titanium oxide, and a titanic acid compound, such as barium titanate and strontium titanate.

The content of the inorganic filler in the resin composition is preferably 30 to 200 parts by mass, more preferably 40 to 150 parts by mass per 100 parts by mass of the total of the polyolefin and the thermoplastic elastomer. By setting the content of the inorganic filler to 30 parts by mass or more, the relative permittivity of the resin composition is prevented from getting too low. By setting the content of inorganic filler to 150 parts by mass or less, the relative permittivity is prevented from getting too high, and the flexibility of the resin composition is also prevented from reducing.

(Flame Retardant Aid)

A flame retardant aid improves the flame retardancy of the resin composition together with the flame retardant. The flame retardant aid may be antimony trioxide, for example Antimony trioxide improves the flame retardancy of the resin composition when used in combination with a halogen-based flame retardant. The content of the flame retardant aid in the resin composition is preferably 0.1 to 30 parts by mass, more preferably 1 to 15 parts by mass per 100 parts by mass of the total of the polyolefin and the thermoplastic elastomer.

(Antioxidant)

An antioxidant prevents oxidation of the resin composition, and the like. Examples of the antioxidant to be used include a radical chain inhibitor, such as a phenolic antioxidant and an amine antioxidant, a peroxide decomposer, such as a phosphorus antioxidant and a sulfur antioxidant, and a metal deactivator, such as a hydrazine antioxidant and an amine antioxidant, which are well-known antioxidants used for thermoplastic elastomers and the like. The antioxidant may be used alone, or in combination of two or more.

The addition amount of the antioxidant may be adjusted in view of antioxidant effect and defects by bleeding. The content of the antioxidant in the resin composition is preferably 0.5 to 10 parts by mass per 100 parts by mass of the total of the polyolefin and the thermoplastic elastomer. Setting the content of the antioxidant to 0.5 parts by mass or more improves the thermal resistance. Setting the content of the antioxidant to 10 parts by mass or less reduces the bleeding.

(Processing Aid)

A processing aid is added for gum produced in extrusion molding and keeping the shape of extrusion molding products. The processing aid may contain at least one of a metallic soap and a polymer lubricant. The content of the processing aid in the resin composition is preferably 0.01 to 10 parts by mass, more preferably 0.1 to 5 parts by mass per 100 parts by mass of the total of the polyolefin and the thermoplastic elastomer.

The resin composition may further contain 40 to 100 parts by mass of a metal hydroxide, and 10 to 30 parts by mass of a halogen-based flame retardant, per 100 parts by mass of the total of the polyolefin and the thermoplastic elastomer. The relative permittivity of the resin composition may be 6 or less, and the dielectric loss tangent of the resin composition may be $1\times10^{-2}$ or less. The sheath 20 formed of such a resin composition provides the communication cable 100 with higher flexibility and better communication characteristics.

(Insulated Wire)

The insulated wire 10 includes the conductors 11, and the covering layer 12 covering the conductors 11 and composed of an insulator. The conductor 11 may be an element wire, or a collective stranded wire formed by bundling multiple element wires. The conductor 11 may be a stranded wire, or a composite stranded wire formed by bundling multiple collective stranded wires. The material of the conductor 11 is not limited. However, it is preferably at least one conductive metallic material selected from the group consisting of copper, copper alloys, aluminum, and aluminum alloys.

The diameter of the conductor 11 is not limited. However, it is preferably 0.435 mm or more, more preferably 0.440 mm or more. The conductor 11 with the above diameter reduces the resistance of the conductor 11. The diameter of the conductor 11 is not limited. However, it is preferably 0.465 mm or less, more preferably 0.460 mm or less. The conductor 11 with the above diameter makes the placement of the insulated wire 10 easy within a narrow and short path. The conductor 11 is preferably a 0.13 sq. conductor defined in accordance with ISO21111-8.

The thickness of the covering layer 12 is not limited. However, it is preferably 0.15 mm or more, more preferably 0.18 mm or more. The covering layer 12 with the above thickness protects the conductors 11 efficiently. The thickness of the covering layer 12 is not limited. However, it is preferably 0.20 mm or less. The covering layer 12 with the above thickness makes the placement of the insulated wire 10 easy within a narrow path.

The insulator forming the covering layer 12 is not limited and only required to have electrical insulation to the conductors 11. The insulator may contain polyolefin and may be the resin composition used for the sheath 20, for example. The insulator forming the covering layer 12 preferably does not contain a plasticizer from the perspective of communication characteristics.

The communication cable 100 can be formed by a well-known method. The communication cable 100 may be formed by covering the outer surface of at least one or more insulated wires 10 with the sheath 20 by extruding the above resin composition by extrusion molding.

As described above, the communication cable 100 includes the insulated wires 10, each including the conductors 11 and the covering layer 12 covering the conductors 11 and made of the insulator, and the sheath 20 covering outer circumferential surfaces of the insulated wires 10 and containing the resin composition containing the polyolefin and the thermoplastic elastomer. The tensile modulus of elasticity of the sheath 20 is 500 MPa or less, and the mass increase rate of the sheath 20 when immersed in diisononyl phthalate at 100° C. for 72 hours is less than 50% by mass. Accordingly, the communication cable 100 with higher flexibility and better communication characteristics is provided.

(Wire Harness)

The wire harness 200 according to the present embodiment incudes the communication cables 100 and the polyvinyl chloride electric wires 110. The communication cables 100 and the polyvinyl chloride electric wires 110 are bundled. The communication cables 100 and the polyvinyl chloride electric wires 110 are electrically connected with a connector 120. The plasticizer does not easily transfer to the above-described sheath 20, and thus the transfer of the plasticizer to the sheath 20 and the covering layers 12 of the insulated wires 10 is prevented even though the polyvinyl chloride electric wires 110 contain the plasticizer. Accordingly, the communication cables 100, and the polyvinyl chloride electric wires 110 that are cheap and highly flexible can be bundled for the wire harness 200.

The polyvinyl chloride electric wires 110 each may include conductors and a covering layer. The similar shape and the material of the conductor 11 of the above-described insulated wire 10 are applicable to the polyvinyl chloride electric wire 110. The similar shape of the covering layer 12 of the above-described insulated wire 10 is applicable to the covering layer of the polyvinyl chloride electric wire 110. The covering layer of the polyvinyl chloride electric wire 110 may contain a plasticizer in addition to polyvinyl chloride. A well-known plasticizer added to polyvinyl chloride may be used. The plasticizer may be at least one selected from the group consisting of a trimellitic acid-based plasticizer, an aliphatic dibasic acid-based plasticizer, an epoxy-based plasticizer, a phthalic acid-based plasticizer, a pyromellitic acid ester-based plasticizer, a phosphate ester-based plasticizer, and an ether ester-based plasticizer.

The phthalic acid-based plasticizer may be at least one phtalic acid ester selected from the group consisting of di(2-ethylhexyl)phthalate (DEHP), di-n-octyl phthalate (DNOP), diisononyl phthalate (DINP), dinononyl phthalate (DNP). diisodecyl phthalate (DIDP), and ditridecyl phthalate.

The trimellitic acid-based plasticizer may be at least one trimellitic ester selected from the group consisting of trioctyl trimellitate (TOTM) and tri-isodecyl trimellitate, for example.

[Examples]

The present embodiment is described below in more detail with reference to examples and comparative examples, but the present embodiment is not limited to these examples.

Figure 4:
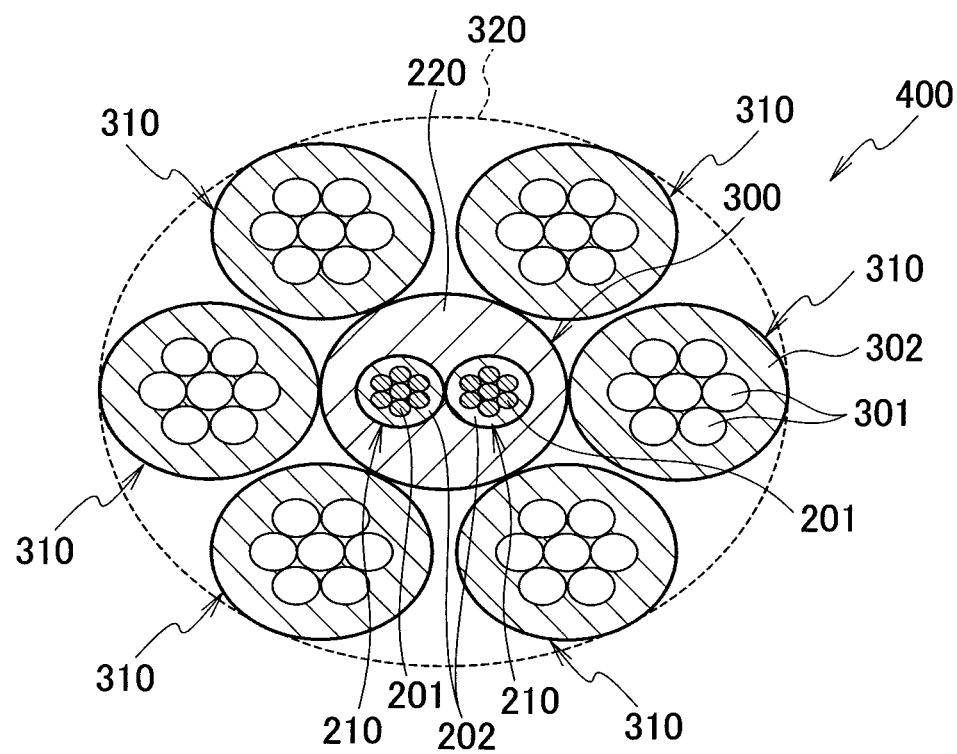
FIG. 4 is a schematic sectional view of a test sample.

First, as a comparative example 1, a communication cable 300 as shown in FIG. 4 was prepared. Then, the effect on the insertion loss of the communication cable 300 according to the comparative example 1 was investigated when the communication cable 300 and the polyvinyl chloride electric wires 310 were bundled.

As shown in FIG. 4, six polyvinyl chloride electric wires 310 were arranged to surround the communication cable 300 according to the comparative example 1 as the center. Next, a polyvinyl chloride tape 320 was wound around the polyvinyl chloride electric wires 310 to make a test sample 400.

The communication cable 300 has outer surfaces of two insulated wires 210 covered with a sheath 220 without gaps. The sheath 220 is made of a mixture of polypropylene and ethylene-vinyl acetate copolymer (EVA). The insulated wires 210 each have multiple conductors 201 having a size of 0.13 sq. covered with a covering layer 202. The covering layer 202 is made of cross-linked polyethylene. The polyvinyl chloride electric wires 310 each include multiple conductors 301 and a covering layer 302 covering the periphery of the conductors 301. The covering layer 302 contains polyvinyl chloride and a plasticizer.

Figure 5:
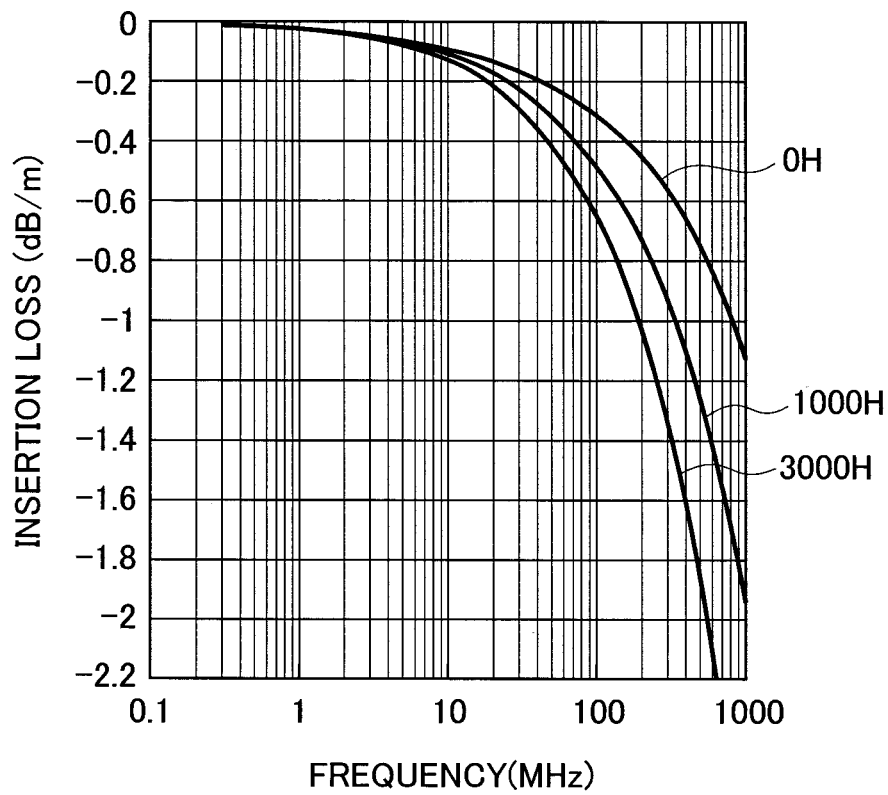
FIG. 5 is a graph illustrating a relationship between frequency and the insertion loss at each heating time.

Next, test samples made as described above were each heated to 100° C. in an oven for 0 hour, 1000 hours and 3000 hours, taken out of the oven, and left at room temperature for a while. Then, the insertion loss of each of these test samples was measured. FIG. 5 shows the results.

FIG. 5 is a graph illustrating a relationship between frequencies and insertion losses at each heating time. As shown in FIG. 5, the insertion loss decreases as the frequency increases. Moreover, when the communication cable 300 and the polyvinyl chloride electric wires 310 were bundled and heated in a high temperature environment for a long time, the insertion loss decreases as the heating time elapses. When the communication cable according to the comparative example 1 is used for a long time in a high temperature such as in a vehicle, communication characteristics in the high frequency region deteriorate, and the desired insertion loss may not be satisfied enough.

Here, the insertion loss depends on the relative permittivity and the dielectric loss tangent as well as frequencies. Accordingly, the relative permittivity and the dielectric loss tangent of the covering layer and those of the sheath were measured when the communication cable according to the comparative example 1 and the polyvinyl chloride electric wires were bundled. Specifically, similar to the above, the communication cable according to the comparative example 1 and the polyvinyl chloride electric wires were bundled and heated in an oven for 1000 hours. Then, the sheath and the covering layer were removed from the communication cable, and processed into a sheet having a length of 80 mm, a width of 3 mm, and a thickness of 0.5 mm. Then, the relative permittivity and the dielectric loss tangent of the sheet were measured by the cavity resonator method using a relative permittivity measuring device provided by AET, INC. The relative permittivity and the dielectric loss tangent were measured at a frequency of 10 GHz in an atmosphere of 30° C.

Figure 6:
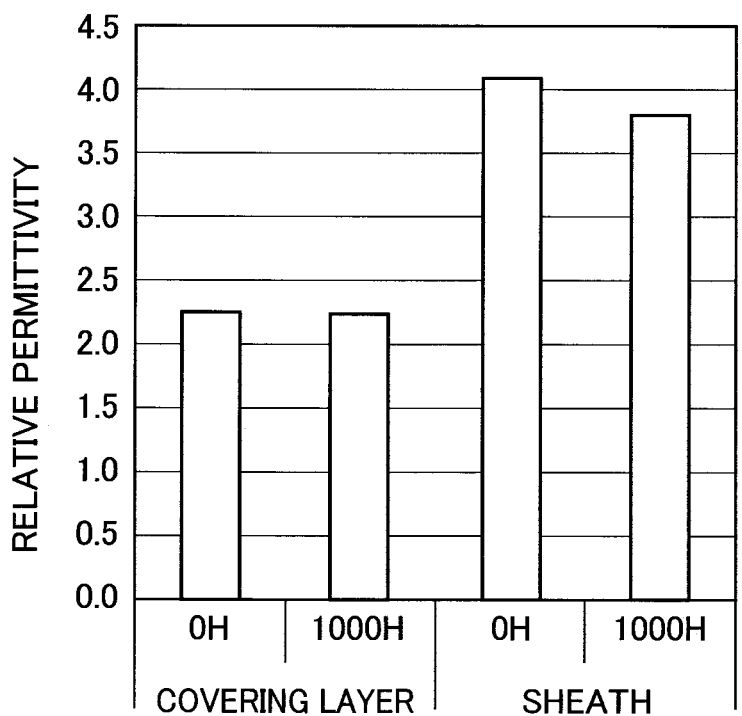
FIG. 6 is a graph comparing relative permittivities before and after a heating test in a covering layer and a sheath.
Figure 7:
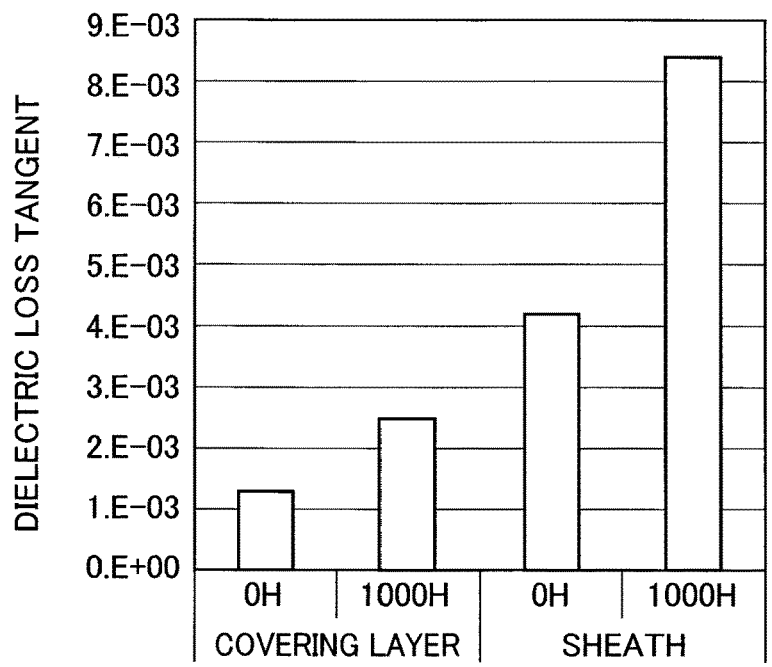
FIG. 7 is a graph comparing dielectric loss tangents before and after the heating test in the covering layer and the sheath.

FIG. 6 is a graph comparing a relative permittivity before the heating test and that after the heating test in each of the covering layer and the sheath. FIG. 7 is a graph comparing a dielectric loss tangent before the heating test and that after the heating test in each of the covering layer and the sheath. As shown in FIG. 6, the relative permittivities show almost no change before and after the heating test in the covering layer and the sheath. In contrast, as shown in FIG. 7, the dielectric loss tangent after the heating test is about twice as large as that before the heating test in each of the covering layer and the sheath.

Figure 8:
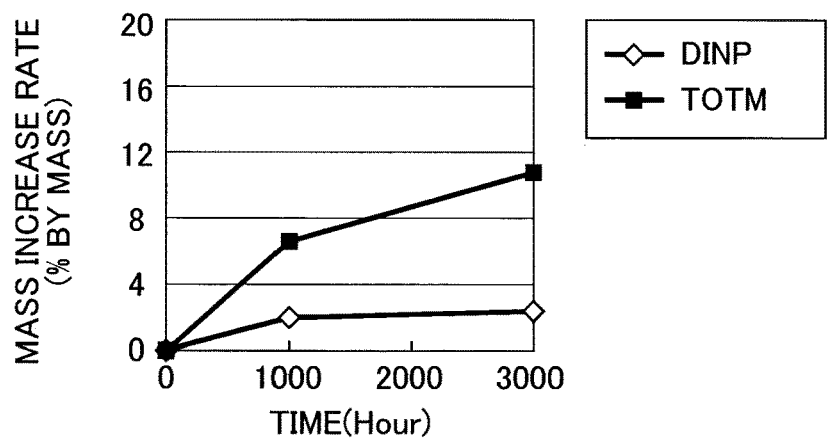
FIG. 8 is a graph illustrating a relationship between heating time and the mass increase rate of a plasticizer in the sheath.
Figure 9:
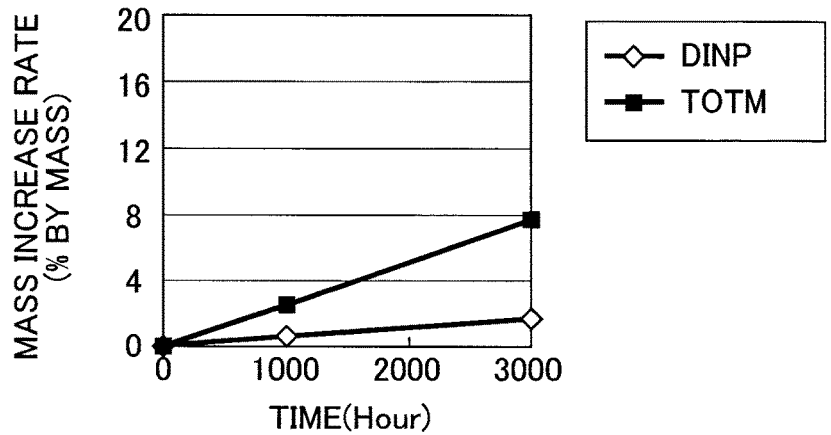
FIG. 9 is a graph illustrating a relationship between heating time and the mass increase rate of the plasticizer in the covering layer.

Next, in the case of bundling the communication cable according to the comparative example 1 and the polyvinyl chloride electric wires, it was confirmed that the plasticizer transferred to the covering layer and the sheath. Specifically, similar to the above, the communication cable according to the comparative example 1 and the polyvinyl chloride electric wires were bundled, and heated in an oven for 1000 and 3000 hours. Then, the sheath and the covering layer were removed from the communication cable, and the mass increase rate of the plasticizer in each of the sheath and the covering layer was measured. As the mass increase rate of the plasticizer, that of diisononyl phthalate (DINP) and that of trioctyl trimellitate (TOTM) were measured. FIGS. 8 and 9 show the results.

FIG. 8 is a graph illustrating a relationship between heating time and the mass increase rate of the plasticizer in the sheath. FIG. 9 is a graph illustrating a relationship between heating time and the mass increase rate of the plasticizer in the covering layer. As shown in FIGS. 8 and 9, the mass increase rate of the plasticizer increases in the sheath and the covering layer as the heating time elapses. Moreover, the mass increase rate of the plasticizer tends to increase in the early stage in the sheath rather than in the covering layer.

Table 1 summarizes the relative permittivity and the dielectric loss tangent of the covering layer, the sheath, and DINP and TOTM, which are the plasticizer. The relative permittivity of the plasticizer does not differ greatly from those of the covering layer and the sheath before the heating test. However, the dielectric loss tangent of the plasticizer is larger than those of the covering layer and the sheath before the heating test.

TABLE 1

|  | Relative Permittivity | Dielectric loss tangent |
| --- | --- | --- |
| Covering layer | 2.25 | $1.3 \times 10^{-3}$ |
| Sheath | 4.10 | $4.2 \times 10^{-3}$ |
| DINP | 2.77 | $1.2 \times 10^{-1}$ |
| TOTM | 2.61 | $8.5 \times 10^{-2}$ |

From these results, the decrease in the insertion loss is considered to depend on the plasticizer contained in the covering layer of the polyvinyl chloride electric wire. Accordingly, the development of a sheath to which the plasticizer does not easily transfer is advanced. In the communication cable according to the example 1, the plasticizer is difficult to transfer, and the decrease in the insertion loss is prevented. The communication cable according to the example 1 was made as follows.

First, 0.13 sq. conductors were covered with cross-linked polyethylene, and two insulated wires defined in accordance with ISO21111-8 were made. These insulated wires were made as a twisted pair and covered with a sheath having blending amounts (parts by mass) shown in Table 2 to be made as a communication cable. As shown in FIG. 2, the communication cable was formed with no vacant space between the sheath and the insulated wires. The outer diameter of the communication cable was 2.5 mm±0.3 mm, and the film thickness of a thin part of the sheath was 0.4 mm±0.1 mm.

[Polyolefin]
(1) Prime Polypro (registered trademark) E150GK (Prime Polymer Co., Ltd) Block polypropylene (block PP)
(2) Mirason (registered trademark) 3530 (DOW-MITSUI POLYCHEMICALS CO., LTD.)
Low density polyethylene (LDPE)
[Thermoplastic Elastomer]
(1) Tuftec (registered trademark) H1221 (Asahi Kasei Corporation)
Polystyrene-poly(ethylene-butylene)-polystyrene (SEBS)
Shore A hardness 42
(2) Tuftec (registered trademark) M1943 (Asahi Kasei Corporation)
Maleic acid anhydride-modified polystyrene-poly (ethylene-butylene)-polystyrene (modified SEBS)
Shore A hardness 67
[Flame Retardant]
(Metal Hydroxide)
(1) Magnesium hydroxide $(Mg(OH)_2)$ YG-O (Konoshima Chemical Co., Ltd)
(Halogen-Based Flame Retardant)
(2) SAYTEX (registered trademark) 8010 (Albemarle Corporation) 1,2-Bis(pentabromophenyl) ethane
[Flame Retardant Aid]
(1) Antimony trioxide $(Sb_2O_3)$ PATOX (registered trademark) M (NIHON SEIKO CO., LTD.)
[Antioxidant]
(1) ADK STAB (registered trademark) AO-20 (ADEKA CORPORATION)
Phenolic Antioxidant
[Processing Aid]
(1) EMS-6P (KATSUTA KAKO CO., LTD.) Metallic soap

TABLE 2

|  |  |  | Example 1 |
| --- | --- | --- | --- |
| Polyolefin | Block PP | E150GK | 35 |
|  | LDPE | 3530 | 35 |
| Thermoplastic elastomer | SEBS | H1221 | 15 |
|  | Modified SEBS | M1943 | 15 |
| Flame retardant | $Mg(OH)_2$ | YG-O | 80 |
|  | Halogen-based flame retardant | 8010 | 30 |
| Flame retardant aid | $Sb_2O_3$ | PATOX-M | 9 |
| Antioxidant | Phenolic antioxidant | AO-20 | 8 |
| Processing aid | Metallic soap | EMS-6P | 0.5 |

Figure 10:
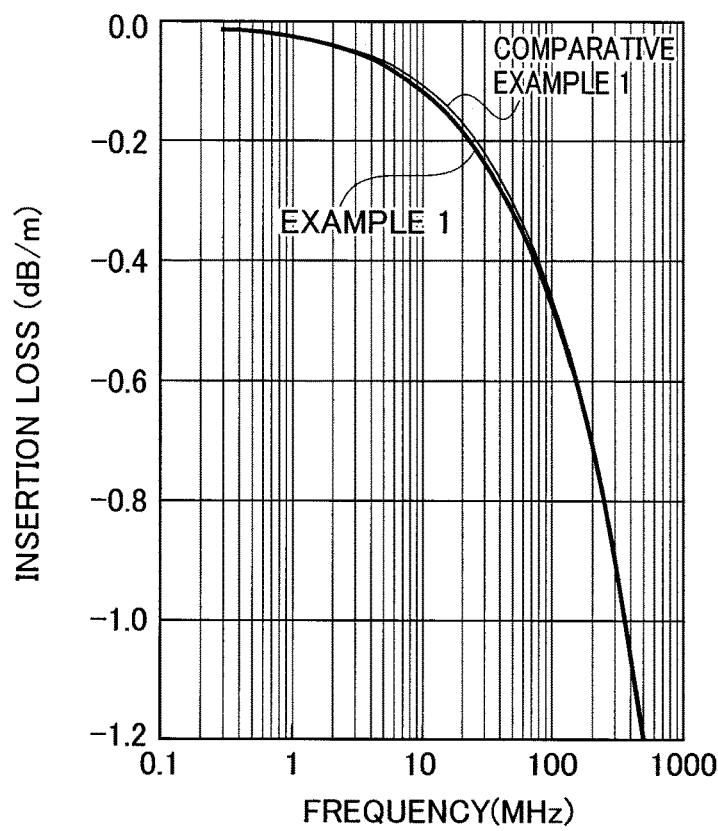
FIG. 10 is a graph illustrating the insertion loss of communication cables according to a comparative example 1 and an example 1 when heated for 500 hours.
Figure 11:
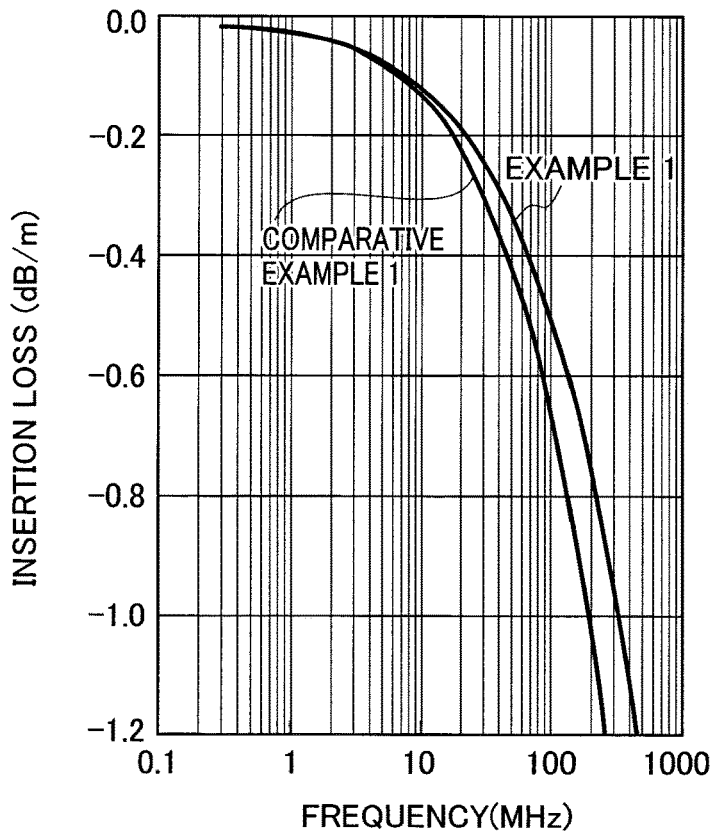
FIG. 11 is a graph illustrating the insertion loss of communication cables according to the comparative example 1 and the example 1 when heated for 2000 hours.

Next, communication cables according to the comparative example 1 and the example 1 were compared for the effect on the insertion loss of the communication cables. Specifically, similar to the above, test samples as shown in FIG. 4 were made and heated at 100° C. for 500 and 2000 hours. FIG. 10 is a graph illustrating the insertion loss when the communication cables according to the comparative example 1 and the example 1 were heated for 500 hours. FIG. 11 is a graph illustrating the insertion loss when the communication cables according to the comparative example 1 and the example 1 were heated for 2000 hours.

As shown in FIG. 10, when the test samples were heated for 500 hours, no significant difference was in the decreases in each insertion loss between the communication cables according to the comparative example 1 and the example 1. In contrast, as shown in FIG. 11, when the test samples were heated for 2000 hours, the communication cable according to the example 1 has the insertion loss reduced to have sufficient communication characteristics, compared to the communication cable according to the comparative example 1. Note that the sheath according to the example 1 before the heating test had the relative permittivity of 3.02 and the dielectric loss tangent of $1.2 \times 10^{-3}$ at a measurement temperature of 30° C. and a measurement frequency of 10 GHz.

Next, the mass increase rate of the communication cables according to the comparative example 1 and the example 1 was measured. For the mass increase rate, the sheaths were removed from the communication cables made as described above and immersed in containers filled with DINP. The sheaths were immersed at 100° C. for 24 hours, 72 hours, and 115 hours in an oven, and were then taken out from the containers, and DINP adhering to the surface of the sheaths was wiped off. The mass of the sheath was measured before and after the immersion in DINP, and the mass increase rate was calculated as follows. DINP manufactured by J-PLUS Co., Ltd. was used.

Mass increase rate=((mass after immersion)/(mass before immersion)−1)×100

Figure 12:
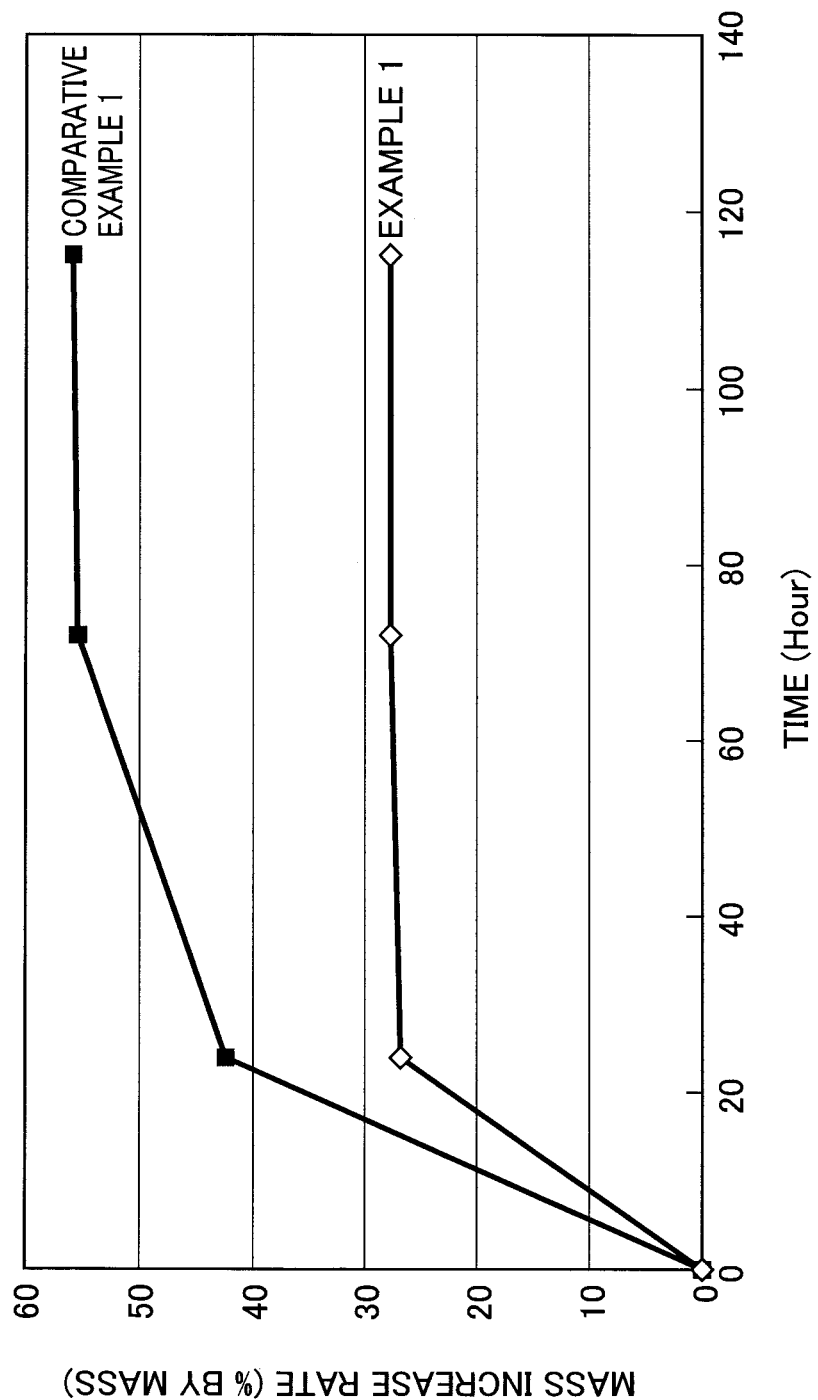
FIG. 12 is a graph illustrating a relationship between heating time and the mass increase rate in sheaths according to the comparative example 1 and the example 1.

FIG. 12 is a graph illustrating a relationship between heating time and the mass increase rate in the sheaths according to the comparative example 1 and the example 1. As shown in FIG. 12, when the sheaths were immersed in DINP, the mass of any sheath according to the comparative example 1 and the example 1 increases. However, the mass increase rate in the sheath according to the example 1 was lower than that in the sheath according to the comparative example 1 at any measured time.

From the above result, it is expected that the plasticizer contained in the polyvinyl chloride electric wires transfers to the sheath, causing the decrease in the insertion loss. Then, by setting the mass increase rate to less than 50% by mass, it is considered possible to determine whether the communication cable has sufficient communication characteristics.

Next, as shown in Tables 3 to 9, examples and comparative examples having different sheath compositions were made. Specifically, 0.13 sq. conductors were covered with cross-linked polyethylene, and two insulated wires defined in accordance with ISO21111-8 were made. These insulated wires were made as a twisted pair and covered with a sheath each having blending amounts (parts by mass) shown in Tables 3 to 9 to be made as communication cables. As shown in FIG. 1, the communication cable was formed with a vacant space between the sheath and the insulated wires. The outer diameter of the communication cable was 2.5 mm±0.3 mm, and the film thickness of a thin part of the sheath was 0.4 mm±0.1 mm.

[Polyolefin]
(1) Prime Polypro (registered trademark) E100GV (Prime Polymer Co., Ltd) Homo polypropylene (homo PP)
Shore D hardness 69 (Shore A hardness more than 80)
(2) Prime Polypro (registered trademark) E150GK (Prime Polymer Co., Ltd)
Block polypropylene (block PP)
Shore D hardness 64 (Shore A hardness more than 80)
(3) POLYBOND (registered trademark) 3200 (Addivant) Maleic acid modified homopolypropylene (modified homo PP)
Shore D hardness 67 (Shore A hardness more than 80)
(4) Mirason (registered trademark) 3530 (DOW-MITSUI POLYCHEMICALS CO., LTD.)
Low density polyethylene (LDPE)
Shore D hardness 51 (Shore A hardness more than 80)
[Thermoplastic Elastomer]
(1) Prime TPO (registered trademark) R110E (Prime Polymer Co., Ltd.)
Reactor-type olefinic thermoplastic elastomer (R-TPO)
Shore A hardness 78
(2) EXCELINK (registered trademark) 1200B (JSR Corporation)
Thermoplastic vulcanizate (TPV)
Shore A hardness 24
(3) MILASTOMER (registered trademark) 4010NS (Mitsui Chemicals, Inc.)
Thermoplastic vulcanizate (TPV)
Shore A hardness 40
(4) Tuftec (registered trademark) H1221 (Asahi Kasei Corporation)
Polystyrene-poly(ethylene-butylene)-polystyrene (SEBS)
Shore A hardness 32
(5) Tuftec (registered trademark) M1943 (Asahi Kasei Corporation)
Maleic acid anhydride-modified polystyrene-poly (ethylene-butylene)-polystyrene (modified SEBS)
Shore A hardness 58
[Flame Retardant]
(Metalhydroxide)
(1) Magnesium hydroxide ($Mg(OH)_2$) YG-O (Konoshima Chemical Co., Ltd) (Halogen-based flame retardant)
(2) SAYTEX (registered trademark) 8010 (Albemarle Corporation) 1,2-Bis(pentabromophenyl) ethane
(3) SAYTEX (registered trademark) CP-2000 (Albemarle Corporation)
Tetrabromobisphenol A
[Flame Retardant Aid]
(1) Antimony trioxide ($Sb_2O_3$) PATOX (registered trademark) M (NIHON SEIKO CO., LTD.)
[Antioxidant]
(1) ADK STAB (registered trademark) AO-20 (ADEKA CORPORATION) Phenolic antioxidant
(2) ADK STAB (registered trademark) AO-60 (ADEKA CORPORATION) Phenolic antioxidant
[Processing Aid]
(1) EMS-6P (KATSUTA KAKO CO., LTD.) Metallic soap
(2) METABLEN (registered trademark) L-1000 (Mitsubishi Chemical Corporation)
Acrylic Polymer Lubricant

TABLE 3

| | | | Example 1 | Example 2 | Example 3 | Example 4 | Example 5 |
|---|---|---|---|---|---|---|---|
| Polyolefin | Homo PP | E100GV | — | — | — | — | — |
| | Block PP | E150GK | 35 | 35 | 55 | 55 | 55 |
| | Modified homo PP | 3200 | — | — | — | — | — |
| | LDPE | 3530 | 35 | 35 | 15 | — | — |
| Thermoplastic elastomer | R-TPO | R110E | — | — | — | — | — |
| | TPV | 1200B | — | 15 | — | — | — |
| | SEBS | H1221 | 15 | — | 10 | 30 | 30 |
| | Modified SEBS | M1943 | 15 | 15 | 15 | 15 | 15 |
| Flame retardant | $Mg(OH)_2$ | YG-O | 80 | 80 | 120 | 90 | 120 |
| | Halogen-based flame retardant | 8010 | 30 | 30 | — | — | — |
| | | CP-2000 | — | — | — | — | — |

TABLE 3-continued

|  |  |  | Example 1 | Example 2 | Example 3 | Example 4 | Example 5 |
|---|---|---|---|---|---|---|---|
| Flame retardant aid | $Sb_2O_3$ | PATOX-M | 9 | 9 | — | — | — |
| Antioxidant | Phenolic antioxidant | AO-20 | 8 | 8 | 8 | 8 | 8 |
|  |  | AO-60 | — | — | — | — | — |
| Processing aid | Metallic soap | EMS-6P | 0.5 | 0.5 | 0.5 | 0.5 | 0.5 |
|  | Polymer lubricant | L-1000 | — | — | — | — | — |
| Tensile modulus of elasticity (MPa) |  |  | 247 | 280 | 376 | 500 or less | 500 or less |
| Mass increase rate (% by mass) |  |  | 28 | 15 | 19 | 39 | 35 |
| Flame retardancy |  |  | good | good | good | — | — |

TABLE 4

|  |  |  | Example 6 | Example 7 | Example 8 | Example 9 | Example 10 |
|---|---|---|---|---|---|---|---|
| Polyolefin | Homo PP | E100GV | 55 | 80 | 75 | 70 | — |
|  | Block PP | E150GK | — | — | — | — | 70 |
|  | Modified homo PP | 3200 | 15 | — | — | — | — |
|  | LDPE | 3530 | — | — | — | — | — |
| Thermoplastic elastomer | R-TPO | R110E | — | — | — | — | — |
|  | TPV | 1200B | — | 20 | — | — | — |
|  | SEBS | H1221 | 30 | — | 25 | 15 | 15 |
|  | Modified SEBS | M1943 | — | — | — | 15 | 15 |
| Flame retardant | $Mg(OH)_2$ | YG-O | 30 | 50 | 50 | 150 | 80 |
|  | Halogen-based flame retardant | 8010 | 30 | 30 | 30 | — | — |
|  |  | CP-2000 | — | — | — | — | — |
| Flame retardant aid | $Sb_2O_3$ | PATOX-M | — | 10 | 10 | — | — |
| Antioxidant | Phenolic antioxidant | AO-20 | 8 | 3 | 3 | 3 | 3 |
|  |  | AO-60 | — | — | — | — | — |
| Processing aid | Metallic soap | EMS-6P | 0.5 | 0.5 | 0.5 | — | 1 |
|  | Polymer lubricant | L-1000 | — | — | — | 1 | — |
| Tensile modulus of elasticity (MPa) |  |  | 439 | 500 or less | 500 or less | 500 or less | 500 or less |
| Mass increase rate (% by mass) |  |  | 15 | less than 30 | less than 50 | less than 50 | less than 50 |
| Flame retardancy |  |  | bad | good | good | good | good |

TABLE 5

|  |  |  | Example 11 | Example 12 | Example 13 | Example 14 | Example 15 |
|---|---|---|---|---|---|---|---|
| Polyolefin | Homo PP | E100GV | — | — | — | — | — |
|  | Block PP | E150GK | 70 | 70 | 70 | 70 | 70 |
|  | Modified homo PP | 3200 | — | — | — | — | — |
|  | LDPE | 3530 | — | — | — | — | — |
| Thermoplastic elastomer | R-TPO | R110E | — | — | — | — | — |
|  | TPV | 1200B | — | — | — | — | — |
|  | SEBS | H1221 | 15 | 15 | 15 | 15 | 15 |
|  | Modified SEBS | M1943 | 15 | 15 | 15 | 15 | 15 |
| Flame retardant | $Mg(OH)_2$ | YG-O | 100 | 100 | 100 | 80 | 80 |
|  | Halogen-based flame retardant | 8010 | 30 | 30 | 10 | 20 | — |
|  |  | CP-2000 | — | — | — | — | 20 |
| Flame retardant aid | $Sb_2O_3$ | PATOX-M | 10 | — | 1 | 5 | 5 |
| Antioxidant | Phenolic antioxidant | AO-20 | 3 | 3 | 3 | 3 | 3 |
|  |  | AO-60 | — | — | — | — | — |
| Processing aid | Metallic soap | EMS-6P | 1 | 1 | 1 | 1 | 1 |
|  | Polymer lubricant | L-1000 | — | — | — | — | — |
| Tensile modulus of elasticity (MPa) |  |  | 500 or less | 500 or less | 500 or less | 500 or less | 500 or less |
| Mass increase rate (% by mass) |  |  | less than 50 | less than 50 | less than 50 | less than 50 | less than 50 |
| Flame retardancy |  |  | good | good | good | good | good |

TABLE 6

|  |  |  | Example 16 | Example 17 | Example 18 | Example 19 | Example 20 |
|---|---|---|---|---|---|---|---|
| Polyolefin | Homo PP | E100GV | — | — | — | — | — |
|  | Block PP | E150GK | 70 | 70 | 55 | 40 | 70 |
|  | Modified homo PP | 3200 | — | — | 15 | — | — |
|  | LDPE | 3530 | — | — | — | 30 | — |

TABLE 6-continued

|  |  |  | Example16 | Example 17 | Example 18 | Example19 | Example20 |
|---|---|---|---|---|---|---|---|
| Thermoplastic elastomer | R- TPO | R110E | — | — | 15 | — | — |
|  | TPV | 1200B | — | — | — | 15 | 15 |
|  | SEBS | H1221 | 15 | 15 | 30 | — | — |
|  | Modified SEBS | M1943 | 15 | 15 | — | 15 | 15 |
| Flame retardant | Mg(OH)$_2$ | YG-O | 40 | 40 | 100 | 100 | 100 |
|  | Halogen-based flame retardant | 8010 | 10 | 30 | 30 | 30 | 30 |
|  |  | CP-2000 | — | — | — | — | — |
| Flame retardant aid | Sb$_2$O$_3$ | PATOX-M | 1 | 10 | 10 | 10 | 10 |
| Antioxidant | Phenolic antioxidant | AO-20 | 3 | 2 | 3 | 3 | 3 |
|  |  | AO-60 | — | 1 | — | — | — |
| Processing aid | Metallic soap | EMS-6P | 1 | 1 | 1 | 1 | 1 |
|  | Polymer lubricant | L-1000 | — | — | — | — | — |
| Tensile modulus of elasticity(MPa) |  |  | 500 or less | 500 or less | 500 or less | 500 or less | 500 or less |
| Mass increase rate (% by mass) |  |  | less than 50 | less than 50 | less than 50 | less than 50 | less than 50 |
| Flame retardancy |  |  | good | good | good | good | good |

TABLE 7

|  |  |  | Example 21 | Example 22 | Example 23 |
|---|---|---|---|---|---|
| Polyolefin | Homo PP | E100GV | — | — | — |
|  | Block PP | E150GK | 50 | 45 | 45 |
|  | Modified homo PP | 3200 | — | — | — |
|  | LDPE | 3530 | — | — | — |
| Thermoplastic elastomer | R-TPO | R110E | — | — | — |
|  | TPV | 4010NS | 35 | 40 | 50 |
|  | SEBS | H1221 | — | — | — |
|  | Modified SEBS | M1943 | 15 | 15 | 5 |
| Flame retardant | Mg(OH)$_2$ | YG-O | 100 | 100 | 100 |
|  | Halogen-based flame retardant | 8010 | 30 | 30 | 30 |
|  |  | CP-2000 | — | — | — |
| Flame retardant aid | Sb$_2$O$_3$ | PATOX-M | 10 | 10 | 10 |
| Antioxidant | Phenolic antioxidant | AO-20 | — | — | — |
|  |  | AO-60 | 2 | 2 | 2 |
| Processing aid | Metallic soap | EMS-6P | — | — | — |
|  | Polymer lubricant | L-1000 | — | — | — |
| Tensile modulus of elasticity (MPa) |  |  | 500 or less | 500 or less | 500 or less |
| Mass increase rate (% by mass) |  |  | less than 50 | less than 50 | less than 50 |
| Flame retardancy |  |  | good | good | good |

TABLE 8

|  |  |  | Comparative example 2 | Comparative example 3 | Comparative example 4 | Comparative example 5 |
|---|---|---|---|---|---|---|
| Polyolefin | Homo PP | E100GV | — | — | 90 | — |
|  | Block PP | E1500K | — | — | — | 54 |
|  | Modified homo PP | 3200 | — | — | — | — |
|  | LDPE | 3530 | — | — | — | — |
| Thermoplastic elastomer | R-TPO | R110E | 100 | 100 | — | — |
|  | TPV | 1200B | — | — | — | — |
|  | SEBS | H1221 | — | — | 10 | 31 |
|  | Modified SEBS | M1943 | — | — | — | 15 |
| Flame retardant | Mg(OH)$_2$ | YG-O | 30 | 50 | 50 | 40 |
|  | Halogen-based flame retardant | 8010 | 30 | 30 | 30 | 30 |
|  |  | GP-2000 | — | — | — | — |
| Flame retardant aid | Sb$_2$O$_3$ | PATOX-M | — | 10 | 10 | 10 |
| Antioxidant | Phenolic antioxidant | AO-20 | 3 | 3 | 3 | 3 |
|  |  | AO-60 | — | — | — | — |
| Processing aid | Metallic soap | EMS-6P | 0.5 | 0.5 | 0.5 | 1 |
|  | Polymer lubricant | L-1000 | — | — | — | — |
| Tensile modulus of elasticity(MPa) |  |  | 500 or less | 500 or less | more than 500 | 500 or less |
| Mass increase rate (% by mass) |  |  | 50 or more | 50 or more | less than 30 | 50 or more |
| Flame retardancy |  |  | bad | good | good | good |

TABLE 9

| | | | Comparative example 6 | Comparative example 7 |
|---|---|---|---|---|
| Polyolefin | Homo PP | E100GV | — | — |
| | Block PP | E150GK | 65 | 45 |
| | Modified homo PP | 3200 | — | — |
| | LDPE | 3530 | — | — |
| Thermoplastic elastomer | R-TPO | R110E | — | — |
| | TPV | 4010NS | 20 | 55 |
| | SEBS | H1221 | — | — |
| | Modified SEBS | M1943 | 15 | 0 |
| Flame retardant | $Mg(OH)_2$ | YG-O | 100 | 100 |
| | Halogen-based flame retardant | 8010 | 30 | 30 |
| | | CP-2000 | — | — |
| Flame retardant aid | $Sb_2O_3$ | PATOX-M | 10 | 10 |
| Antioxidant | Phenolic antioxidant | AO-20 | — | — |
| | | AO-60 | 2 | 2 |
| Processing aid | Metallic soap | EMS-6P | — | — |
| | Polymer lubricant | L-1000 | — | — |
| Tensile modulus of elasticity (MPa) | | | more than 500 | more than 500 |
| Mass increase rate (% by mass) | | | less than 50 | less than 50 |
| Flame retardancy | | | good | good |

The physical properties of the sheath were evaluated by the following method. Tables 3 to 9 show these results.

[Evaluation]

(Tensile Modulus of Elasticity)

The sheath was removed from each of the communication cables made as described above. The removed sheath was strained at a strain rate of 50 mm/min at room temperature of 20° C. in accordance with the provisions of JIS K7161-1. Then, the tensile modulus of elasticity was calculated with the stress at 0.00005 and the stress at 0.0025 in the sheath.

(Mass Increase Rate)

The sheath was removed from each of the communication cables made as described above and immersed in a container filled with DINP. After the sheath was immersed in an oven for 72 hours, the sheath was taken out from the container, and DINP adhering to the surface of the sheath was wiped off. The mass of the sheath before and after the immersion in DINP was measured and the mass increase rate was calculated and determined as follows. DINP manufactured by J-PLUS Co., Ltd. was used.

Mass increase rate=((mass after immersion)/(mass before immersion)−1)×100

(Flame Resistance)

The flame resistance was evaluated in accordance with the provisions of ISO21111-8. Those conforming to the provisions were determined as "good", and those not conforming to the provisions were determined as "no".

(Dielectric Properties)

The relative permittivity and the dielectric loss tangent were measured by the cavity resonator method using a relative permittivity measuring device provided by AET, INC. Specifically, resin compositions shown in Tables 3 to 9 were each processed into a sheet having a length of 80 mm, a width of 3 mm, and a thickness of 0.5 mm, and the relative permittivity and the dielectric loss tangent of the sheet were measured at a frequency of 10 GHz in an atmosphere of 30° C.

Communication cables according to the examples 1 to 23 have the tensile modulus of elasticity and the mass increase rate of the sheath less than or equal to specific values and are considered to have high flexibility and sufficient communication characteristics. In contrast, communication cables according to comparative examples 2 to 7 have the tensile modulus of elasticity or the mass increase rate of the sheath not less than or equal to specific values and are considered to have insufficient flexibility or insufficient communication characteristics.

Next, as a reference example 1, a polyvinyl chloride resin composition used for a covering layer of a general polyvinyl chloride electric wire was made. Table 10 shows the blending ratio (parts by mass) of the resin composition according to the reference example 1.

TABLE 10

| | | Reference example 1 |
|---|---|---|
| Polyvinyl chloride | TH-1300 | 100 |
| Plasticizer | DINP | 40 |
| | DIDP | 5 |
| Stabilizer | RUP-110 | 4 |
| Filler | Calcium carbonate | 30 |

Polyvinyl chloride TAIYO VINYL CORPORATION TH-1300
Plasticizer J-PLUS Co., Ltd. DINP, J-PLUS Co., Ltd. DIDP
Ca/Zn Stabilizer ADEKA CORPORATION RUP-110
Filler Calcium carbonate Shiraishi Calcium Kaisha, Ltd. Vigot10

Figure 13:
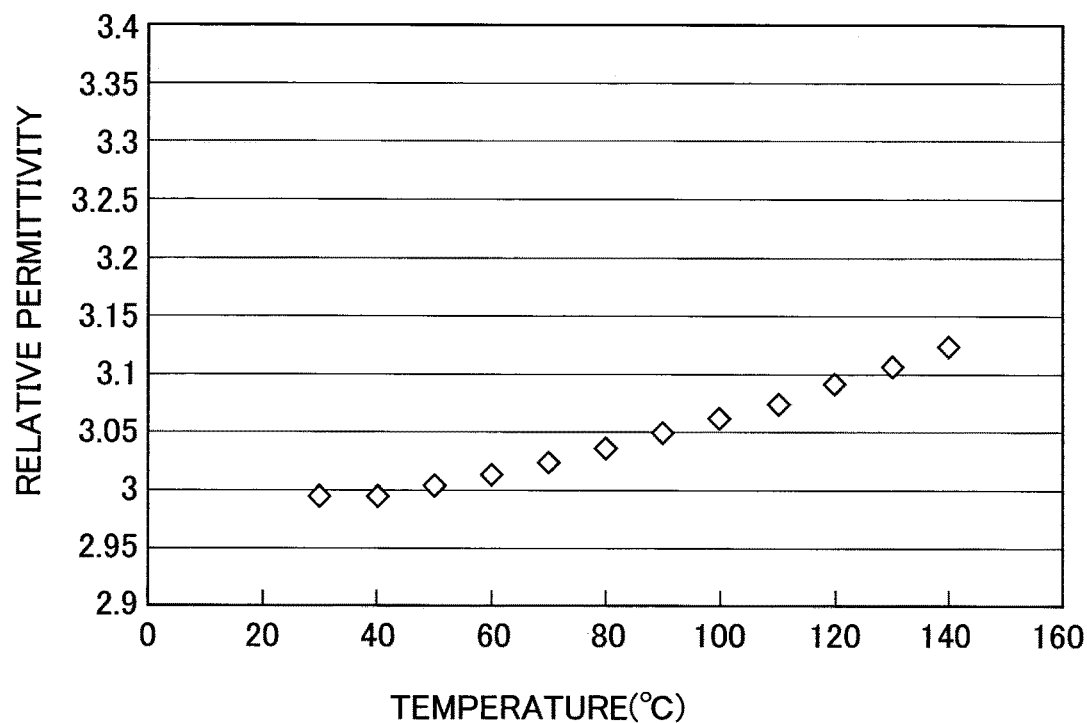
FIG. 13 is a graph illustrating a relationship between measurement temperature and the relative permittivity in a resin composition according to a reference example 1.
Figure 14:
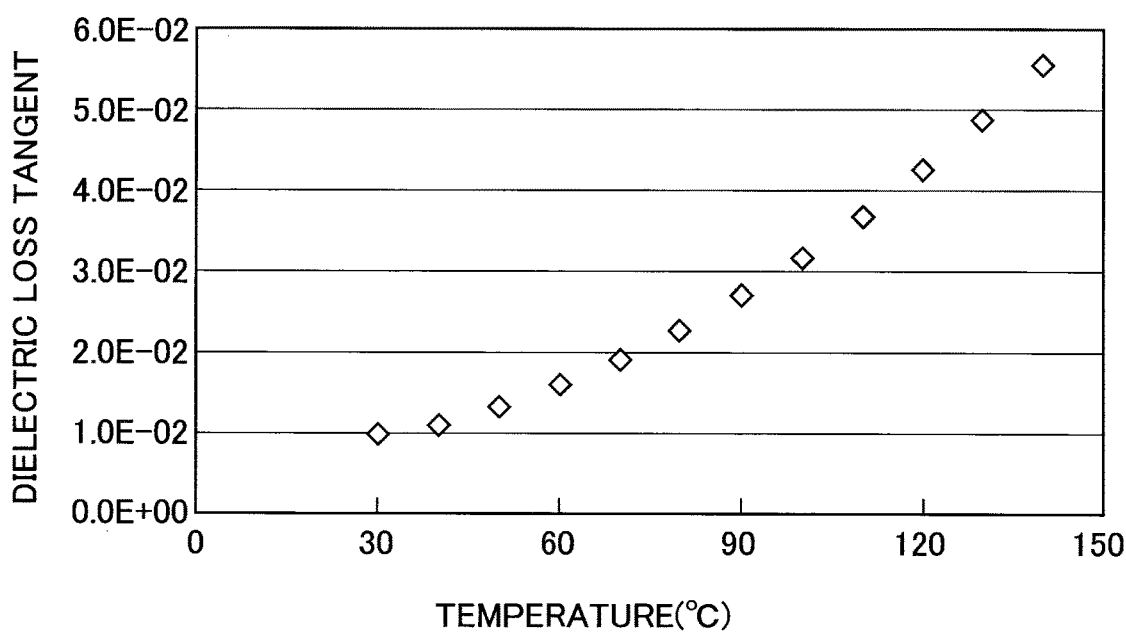
FIG. 14 is a graph illustrating a relationship between measurement temperature and the dielectric loss tangent in the resin composition according to the reference example 1.
Figure 15:
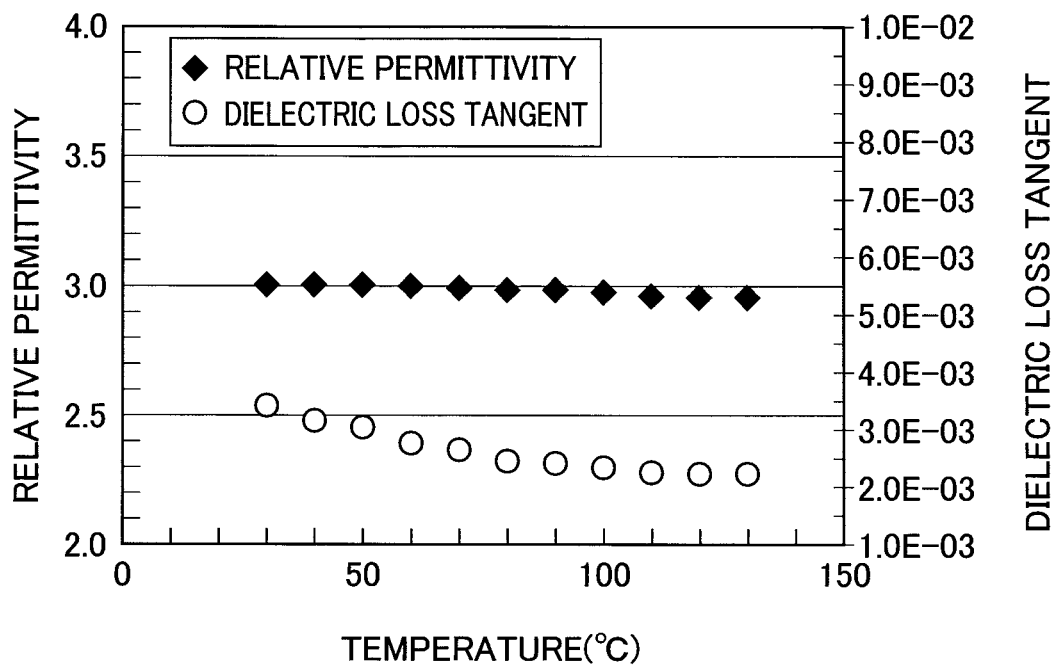
FIG. 15 is a graph illustrating a relationship between measurement temperature, and the relative permittivity and dielectric loss tangent in a resin composition according to an example 2.
Figure 16:
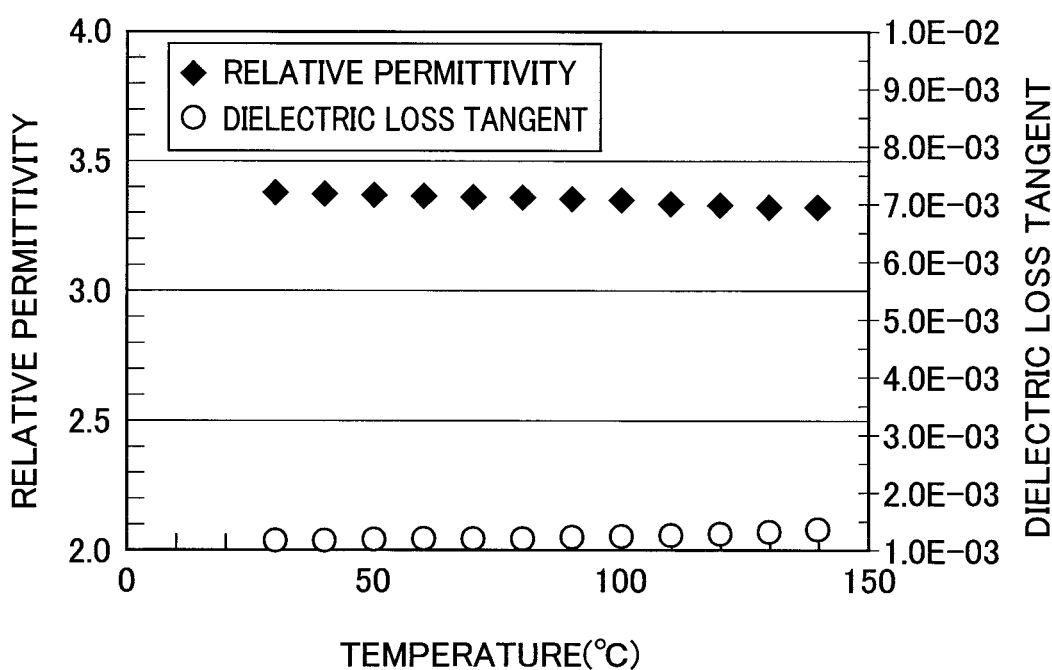
FIG. 16 is a graph illustrating a relationship between measurement temperature, and the relative permittivity and dielectric loss tangent in a resin composition according to an example 3.

Next, the relative permittivity and the dielectric loss tangent of rein compositions of the reference example 1, the example 2, and the example 3 were measured. These resin compositions are not subjected to the above-described heating test. FIGS. 13 to 16 show these measurement results. FIG. 13 is a graph illustrating a relationship between measurement temperature and the relative permittivity in the resin composition according to the reference example 1. FIG. 14 is a graph illustrating a relationship between measurement temperature and the dielectric loss tangent in the resin composition according to the reference example 1. FIG. 15 is a graph illustrating a relationship between measurement temperature, and the relative permittivity and the dielectric loss tangent in the resin composition according to the example 2. FIG. 16 is a graph illustrating a relationship between measurement temperature, and the relative permittivity and the dielectric loss tangent in the resin composition according to the example 3.

As shown in FIGS. 13 to 16, the relative permittivity of the resin composition according to the reference example 1 does not differ greatly from those of the resin compositions according to the examples 2 and 3. In contrast, the dielectric loss tangent of the resin composition according to the reference example 1 is about 10 times as large as those of the resin compositions according to the examples 2 and 3. These results also presume that the communication cables according to the examples have excellent communication characteristics.

Although the present embodiment has been described above with reference to the examples, the present embodiment is not limited to these, and various modifications can be made within the scope of the gist of the present embodiment.

What is claimed is:

1. A communication cable comprising:
an insulated wire comprising a conductor and a covering layer covering the conductor, the covering layer being made of an insulator; and
a sheath covering an outer circumferential surface of the insulated wire, the sheath including a resin composition containing a polyolefin and a thermoplastic elastomer,
wherein a tensile modulus of elasticity of the sheath is 500 MPa or less,
a mass increase rate of the sheath is less than 50% by mass when the sheath is immersed in a diisononyl phthalate at 100° C. for 72 hours,
the thermoplastic elastomer includes a thermoplastic vulcanizate, and
a content rate of the thermoplastic vulcanizate to the total of the polyolefin and the thermoplastic elastomer is 35% by mass or more and 50% by mass or less, and a shore A hardness of the thermoplastic vulcanizate is 31 or more and 42 or less.

2. The communication cable according to claim 1, wherein a shore A hardness of the thermoplastic elastomer is 80 or less.

3. The communication cable according to claim 1, wherein
the resin composition further contains 40 to 150 parts by mass of a metal hydroxide per 100 parts by mass of the total of the polyolefin and the thermoplastic elastomer.

4. The communication cable according to claim 1, wherein
the resin composition further contains 40 to 100 parts by mass of a metal hydroxide and 10 to 30 parts by mass of a halogen-based flame retardant per 100 parts by mass of the total of the polyolefin and the thermoplastic elastomer,
a relative permittivity of the resin composition is 6 or less, and
a dielectric loss tangent of the resin composition is $1 \times 10^{-2}$ or less.

5. The communication cable according to claim 1, wherein
a relative permittivity of the resin composition is 2.5 or more and 4.0 or less,
a dielectric loss tangent of the resin composition is $8.0 \times 10^{-3}$ or less, and
the conductor is a conductor of 0.13 sq. specified in ISO21111-8.

6. The communication cable according to claim 1, wherein
a relative permittivity of the resin composition is 3.0 or more and 3.5 or less.

7. A wire harness comprising:
the communication cable according to claim 1; and
a polyvinyl chloride electric wire,
wherein the communication cable and the polyvinyl chloride electric wire are bundled.

* * * * *